April 7, 1942.  C. D. MORTON  2,278,554
TREAD PLATE
Filed July 14, 1939
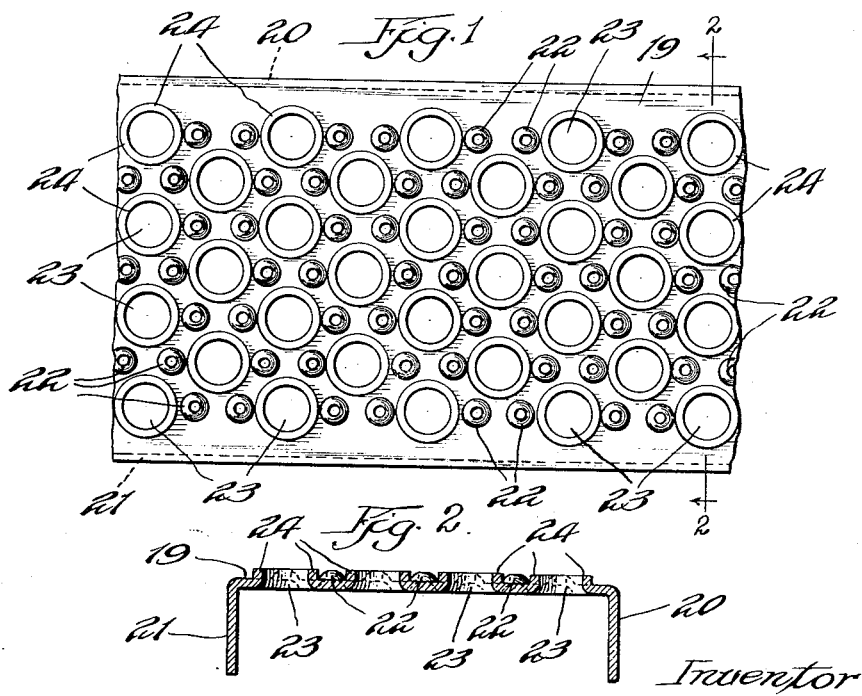
Inventor:
Charles D. Morton:
By: Wilkinson, Huxley, Byron & Knight
Attys.

Patented Apr. 7, 1942

2,278,554

UNITED STATES PATENT OFFICE 2,278,554

TREAD PLATE

Charles D. Morton, Chicago, Ill., assignor to Morton Manufacturing Company, Chicago, Ill., a corporation of Illinois Application July 14, 1939, Serial No. 284,398

1 Claim. (Cl. 94—11)

My invention relates to a metal tread plate, and has particular reference to a tread of the non-slipping variety having openings therethrough whereby dirt, snow and the like, pass through the plate when it is faced upward with clearance underneath, so that in effect the plate is substantially self-cleaning.

Another and further object of my invention is the provision of a metal tread plate especially adapted for use on runways for railway box cars, doors in sidewalks, and the like, where it is desirable to admit air to a space in the sidewalk and yet provide means for snow, dirt and the like to be forced through the tread and drop below the tread. In the case of a runway for a car the foreign matter passes underneath the tread, so that sufficient surface is provided to grip the soles of the shoes of the wearer as he passes over the tread. A tread is thus provided which is substantially self-cleaning and yet affords sufficient friction on the surface thereof so that one walking over the surface is not apt to slip and fall.

Another and further object of my invention is the provision of a tread in which the arrangement of openings therethrough is such that enough space is provided for the passage of a normal quantity of snow, ice or the like, which collects on the plate, and yet maintains a substantially level tread surface at all times with means thereon to prevent slippage and without the possibility of any portion of the shoes being caught or wedged into the surface of the tread, thereby causing the wearer to lose his balance or fall.

Another and further object is the provision of a metal tread having rows of dome-shaped bosses thereon, preferably placed in longitudinal rows, with central perforations through the bosses so that gripping edges are formed around the edges of these openings. Rows of openings of much larger size than those in the bosses are placed in the plate extending preferably both horizontally and laterally. The spacing and arrangement of the large openings is sufficient to enable the plate to be substantially self-cleaning and yet provide a sufficient number of bosses spaced around each other of the larger openings to provide an adequate gripping surface for the tread to prevent danger of slippage.

These and other objects of my invention will be more fully and better understood by reference to the accompanying sheet of drawings, and in which—

Figure 1 is a plan view of a section of a plate embodying my invention; and

Figure 2 is a sectional view on line 2—2 of Figure 1.

Referring now particularly to the drawing, a metal tread plate 19 is shown, composed of metal rolled or extruded as the case may be, with integrally formed depending downwardly extending flanges 20 and 21 which support the tread portion of the plate 19 in spaced relation from the base upon which it is mounted, and which allows for accumulation of snow, ice or the like, under the plate 19 while it is in use. On the upper surface of the plate is a plurality of bosses 22, 22, these bosses being struck upward from the under side of the plate. The bosses 22, 22 are perforated centrally thereof, the upper surface of the bosses 22, 22 being dome-shaped, while the perforations extend vertically thereof so that sharp edges are formed at the intersection of the perforations and the upper surface of the bosses 22, 22, thereby forming gripping edges on the bosses.

It is old in the art to provide tread surfaces having these bosses covering the entire surface, and I have provided a plate 19 having openings 23, 23 extending through the plate, these openings being comparatively large in size as compared with the perforations through the bosses 22, 22. The openings 23, 23 have flanges 24, 24 extending therearound for the purpose of strengthening the plate 19 and providing a comparatively level tread surface so that danger of slippage and stumbling is avoided. The flanges 24, 24 are of substantially the same height above the plate 19 as the bosses 22, 22, thereby avoiding the objection that an uneven tread surface is presented. The flanges also perform the function of strengthening the plate against bending stresses, so that the plate may be made of lighter gauge material than if these flanges 24, 24 were omitted. The openings 23, 23 are arranged in spaced rows extending in a horizontal direction and also in a transverse direction, with any opening being in staggered relation with respect to the openings in adjacent rows in either direction. By this arrangement a very large portion of the surface of the tread is open for the passage of obstructing material while maintaining a tread sufficiently strong to withstand the weight of a person walking thereon and supplying a sufficient amount of tread surface to engage the soles of the shoes of the wearer to avoid slippage.

It will be understood that in the formation of the plate through the relationship of the openings therein and the arrangement of the bosses, a non-slipping surface is provided for the plate and at the same time the openings will allow foreign material to pass therethrough. Under normal circumstances the surface of the plate will be sufficiently free of foreign material so that danger of slipping thereon is avoided. The method used in forming the bosses and the holes through the plate is well known in the art and it is not believed a detailed description is necessary in this connection.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of the appended claim.

I claim:

A metal tread comprising a plate having rows of dome-shaped bosses struck up above the surface of the plate, the said bosses being centrally perforated whereby gripping edges are formed at the intersections of the upper surfaces and the perforations on the said bosses, the plate having spaced rows of circular openings therethrough, the rows extending both longitudinally and transversely of the plate, the openings in each row in each direction being in staggered relation with respect to the openings in adjacent rows in each direction, the openings having flanges thereon projecting upward from the tread side of the plate of substantially the same height as the bosses.

CHARLES D. MORTON.